(12) United States Patent
Schroder et al.

(10) Patent No.: US 10,768,273 B2
(45) Date of Patent: Sep. 8, 2020

(54) ORTHOGONAL PHASE MODULATION FOR DETECTION AND COMMUNICATION IN RADAR

(71) Applicants: IEE INTERNATIONAL ELECTRONICS & ENGINEERING S.A., Echternach (LU); UNIVERSITE DU LUXEMBOURG, Esch-sur-Alzette (LU)

(72) Inventors: Udo Schroder, Fohren (DE); Hans-Peter Beise, Perl (DE); Thiemo Spielmann, Bivange (LU); Sayed Hossein Dokhanchi, Belvaux (LU)

(73) Assignees: IEE INTERNATIONAL ELECTRONICS & ENGINEERING S.A., Echternach (LU); UNIVERSITE DU LUXEMBOURG, Esch-sur-Alzette (LU)

( * ) Notice: Subject to any disclaimer, the term of this patent is extended or adjusted under 35 U.S.C. 154(b) by 0 days.

(21) Appl. No.: 16/612,223

(22) PCT Filed: May 9, 2018

(86) PCT No.: PCT/EP2018/062078
§ 371 (c)(1),
(2) Date: Nov. 8, 2019

(87) PCT Pub. No.: WO2018/206681
PCT Pub. Date: Nov. 15, 2018

(65) Prior Publication Data
US 2020/0209347 A1 Jul. 2, 2020

(30) Foreign Application Priority Data
May 10, 2017 (LU) .......................... 100243

(51) Int. Cl.
*G01S 7/00* (2006.01)
*G01S 13/32* (2006.01)
(Continued)

(52) U.S. Cl.
CPC ............ *G01S 7/006* (2013.01); *G01S 13/325* (2013.01); *G01S 13/878* (2013.01);
(Continued)

(58) Field of Classification Search
CPC ...... G01S 7/006; G01S 13/325; G01S 13/878; G01S 13/931; G01S 2013/9316; G01S 2013/93271; G01S 7/023; H04B 7/0682
See application file for complete search history.

(56) References Cited

U.S. PATENT DOCUMENTS

| 4,733,238 A | 3/1988 | Fiden | |
|---|---|---|---|
| 2011/0243266 A1* | 10/2011 | Roh | .................... H04L 27/3472 375/261 |

OTHER PUBLICATIONS

International Search Report corresponding to International application No. PCT/EP2018/062078, dated Jul. 24, 2018, 5 pages.
(Continued)

*Primary Examiner* — Timothy A Brainard
(74) *Attorney, Agent, or Firm* — Reising Ethington P.C.

(57) ABSTRACT

A method of orthogonal modulation of radar waves of a phase-modulated continuous wave radar system. The method includes selecting an equidistant bi-phased or multi-phased phase-modulation sequence, phase-modulating the continuous radar wave, and transmitting the orthogonal phase-modulated continuous radar wave towards a scene. The method includes generating a detection sequence (s) by applying an outer coding (H) to the phase-modulation sequence, selecting a communication range (C) in the complex number plane, based on the selected phase-modulation, generating a communication sequence (c) having a plurality of sequence members, mapping the communication (Continued)

sequence (c) into the communication range (C) by applying an injective mapping function ($\Gamma$) to the sequence members, and calculating a numerical product of members of the detection sequence (s) with members of an image of the mapped communication sequence (c). Phase-modulating the continuous wave of the radar system is carried out according to the calculated numerical products.

9 Claims, 8 Drawing Sheets

(51) Int. Cl.
    *G01S 13/87*     (2006.01)
    *H04B 7/06*     (2006.01)
    *G01S 13/931*     (2020.01)
    *G01S 7/02*     (2006.01)

(52) U.S. Cl.
    CPC .......... *G01S 13/931* (2013.01); *H04B 7/0682* (2013.01); *G01S 7/023* (2013.01); *G01S 2013/9316* (2020.01); *G01S 2013/93271* (2020.01)

(56) References Cited

OTHER PUBLICATIONS

Written Opinion corresponding to International application No. PCT/EP2018/062078, dated Jul. 24, 2018, 6 pages.

A. Bourdoux et al., "PMCW Waveform and MIMO Technique for a 79 GHz CMOS Automotive Radar", IEEE Radar Conference (Radarconf), dated May 2, 2016, 5 pages.

A. Hassanien et al., "Phase-Modulation Based Dual-Function Radar-Communications", IET Radar Sonar Navigation, The Institution of Engineering and Technology, UK, vol. 10 No. 8, dated Oct. 1, 2016, pp. 1411-1421.

A. Hassanien et al., "Dual-Function Radar-Communications: Information Embedding Using Sidelobe Control and Waveform Diversity," IEEE Transactions on Signal Processing, vol. 64, No. 8, Apr. 15, 2016, pp. 2168-2181.

C. Sturm et al., "Waveform Design and Signal Processing Aspects for Fusion of Wireless Communications and Radar Sensing", Proceedings of the IEEE, IEEE. New York, US, vol. 99 No. 7, dated Jul. 1, 2011, pp. 1236-1259.

S. Surender et al., "UWB Noise-OFDM Netted Radar: Physical Layer Design and Analysis", IEEE Transactions on Aerospace and Electronic Systems, vol. 47, No. 2, Apr. 2011, pp. 1380-1400.

H. Aboulnasr et al., "Phase-Modulation Based Dual-Function Radar-Communications", IET Radar Sonar Navigation, Oct. 1, 2016 The Institution of Engineering and Technology, UK—ISSN 1751-8784, http://dx.doi.org/10.1049/iet-rsn.2015.0484, vol. 10, No. 8, pp. 1411-1421. XP006060864.

A. Bourdoux et al., "PMCW Waveform and MIMO Technique for a 79 GHz CMOS Automotive Radar", 2016 IEEE Radar Conference (RadarConf), May 2, 2016 IEEE, http://dx.doi.org/10.1109/RADAR.2016.7485114, pp. 1-5. XP032908898.

C. Strum et al., "Waveform Design and Signal Processing Aspects for Fusion of Wireless Communications and Radar Sensing", Proceedings of the IEEE, Jul. 1, 2011 IEEE. New York, US—ISSN 0018-9219, http://dx.doi.org/10.1109/JPROC.2011.2131110, vol. 99, No. 7, pp. 1236-1259. XP011367583.

\* cited by examiner

ORTHOGONAL PHASE MODULATION FOR DETECTION AND COMMUNICATION IN RADAR

TECHNICAL FIELD

The invention relates to a method of orthogonal modulation of radar waves of a phase-modulated continuous wave radar system by a sequence of numerical communication symbols, an automotive phase-modulated continuous wave radar system that is configured for performing such method, a communication sequence demodulating device and a detection sequence backprojection demodulating device.

BACKGROUND OF THE INVENTION

It is known in the art to employ radar technology in exterior automotive applications, such as driver assistance systems, for providing improved safety by facilitating an optimized reaction of a driver of a vehicle with appropriate warnings, such as vulnerable road user detection systems, lane change assist systems or blind spot monitoring systems, or even by automatically taking over control of the vehicle, for instance in collision mitigation systems. The most common exterior automotive rated devices operate at radar carrier frequencies in regimes about 24 GHz or about 77 GHz.

A typical scenario is illustrated in FIG. 1. A vehicle 18 designed as a passenger car uses a radar system 10 that is installed at a front region 22 of the vehicle 18 and that transmits radar waves towards a scene in front of the vehicle 18 for detecting obstacles 24 or vehicles 20 of an oncoming traffic appearing in the radar system field of view 26 in a detection path 28. In the following, the radar wave-transmitting radar system 10 is referred to as "ego radar system" for brevity.

Moreover, there is an upcoming desire to furnish vehicles with automatic communication systems, serving the purpose of avoiding accidents and thus potential injuries. In FIG. 1, this is indicated by a communication path 30 between the ego radar system 10 and a radar system 10 of the oncoming vehicle 20 shown on the left side of FIG. 1 as a communication partner.

A fast and reliable communication could be based on electromagnetic waves, which are already generated by on-board radar systems, however, those usually are primarily designed for detection of obstacles and traffic participants, and not for communication purposes in the first place. Consequently, radar systems that also enable communication are held to require a huge amount of technical effort.

For instance, in the article by Shrawan C. Surender and Ram M. Narayanan, "*UWB Noise-OFDM Netted Radar: Physical Layer Design and Analysis*", IEEE Transactions on Aerospace and Electronic Systems, vol. 47, no. 2, April 2011, pp. 1380-1400, a scheme is proposed to modify an ultra-wideband (UWB) noise radar in order to supplement it with secure multi-user network communication capabilities. UWB noise radar achieves high-resolution imaging of targets and terrain. The wide bandwidth yields fine range resolution, while the noise waveform provides immunity from detection, interference, and interception. Having multiple noise radars networked with each other provides significant benefits in target detection and recognition. The salient features of the proposed UWB noise-orthogonal frequency-division multiplexing (OFDM) multi-functional netted radar system include surveillance with embedded security-enabled OFDM-based communications, multi-user capability, and physical layer security.

In the relevant article, a single waveform has been designed by dividing the available bandwidth into three sections, wherein communication information is embedded in the center of a spectrum and two side bands are allocated for radar. The effect of communication data on target range estimation has been investigated, but the influence of the Doppler shift is not considered.

In the article by A. Hassanien, M. G. Amin, Y. D. Zhang and F. Ahmad, "*Dual-Function Radar-Communications: Information Embedding Using Sidelobe Control and Waveform Diversity*," IEEE Transactions on Signal Processing, vol. 64, no. 8, Apr. 15, 2016, pp. 2168-2181, a technique for a dual-function system with joint radar and communication platforms is described. Sidelobe control of the transmit beamforming in tandem with waveform diversity enables communication links using the same pulse radar spectrum. Multiple simultaneously transmitted orthogonal waveforms are used for embedding a sequence of LB bits during each radar pulse. Two weight vectors are designed to achieve two transmit spatial power distribution patterns, which have the same main radar beam, but differ in sidelobe levels towards the intended communication receivers. Communication information is transmitted by controlling side-lobe levels of beam-pattern at fixed points in an angular space. The receiver interpretation of the bit is based on its radiated beam. The proposed technique allows information delivery to single or multiple communication directions outside the main lobe of the radar. It is shown that the communication process is inherently secure against intercept from directions other than the pre-assigned communication directions. The employed waveform diversity scheme supports a multiple-input multiple-output radar operation mode.

It is noted that stationary targets are a prerequisite of the proposed method, and a drawback is that the radar system will lose the target if it moves outside that certain angular space.

In order to eliminate this drawback, the same authors propose in the article "*Phase-modulation based dual-function radar communications*", Institution of Engineering and Technology (IET) Radar Sonar Navig., vol. 10, no. 8, pp. 1411-1421, to design a bank of transmit beamforming weight vectors such that they form the same transmit power radiation patterns, whereas the phase associated with each transmit beam towards the intended communication directions belongs to a certain phase constellation. During each radar pulse, a binary sequence is mapped into one point of the constellation which, in turn, is embedded into the radar emission by selecting the transmit weight vectors associated with that constellation point. The communication receiver detects the phase of the received signal and uses it to decode the embedded binary sequence. The proposed technique allows information delivery to the intended communication receiver regardless of whether it is located in the sidelobe region or within the main radar beam. Three signaling strategies are proposed which can be used to achieve coherent communications, non-coherent communications, and non-coherent broadcasting, respectively.

SUMMARY

It is therefore desirable to provide an operation method and an improved automotive radar system that enable radar detection and communication with other traffic participants with reduced hardware effort and in a more robust manner.

In one aspect of the present invention, the object is achieved by a method of orthogonal modulation of radar waves of a phase-modulated continuous wave (PMCW) radar system by a sequence of numerical communication symbols.

The method comprises steps of:
- selecting an equidistant bi-phased or multi-phased phase-modulation sequence, wherein members of the sequence are given by complex roots of unity,
- phase-modulating the continuous radar wave of the radar system, and
- transmitting the orthogonal phase-modulated continuous radar wave towards a scene.

The method is characterized by the following steps of
- generating a detection sequence by applying an outer coding to the bi-phased or multi-phased phase-modulation sequence,
- selecting a communication range in the complex number plane, based on the selected equidistant bi-phased or multi-phased phase-modulation,
- generating a communication sequence comprising a plurality of sequence members, wherein the members are natural numbers,
- mapping the communication sequence into the communication range by applying an injective mapping function to the members of the communication sequence,
- calculating a numerical product of members of the detection sequence with members of an image of the mapped communication sequence, wherein the step of phase-modulating the continuous radar wave of the radar system is carried out according to the calculated numerical products.

In phase-modulated continuous wave (PMCW) radar system, phase-modulation sequences s are used with members that are located in the complex unit circle $\mathbb{U} := \{z \in \mathbb{C} : \|z\|=1\}$, and thus are selected from a set S of all roots of unity $$S := \left\{ e^{2\pi i \frac{k}{n}} : k = 0, \ldots, n-1 \right\} \quad (1)$$

The simplest case is a bi-phase modulation with n=2, wherein the sequence jumps between two phases of 0° and 180°. In general, the phase-modulation sequence s operates in values $z_i \in \mathbb{C}$, i=1, . . . , n.

Further, in PMCW radar systems, an outer coding is applied to the phase-modulation sequence. One example of the outer coding that is used in multi-transmitter PMCW radar systems is the Hadamard coding, which means that a detection sequence s is generated by multiplying the phase-modulation sequence with values $H_{ij}$, i=1,2, . . . , N, when sent from transmitter j∈{1, . . . , L}. The resulting outer coded detection sequences has values in the set $P := \{H_{ij} s_k : i=1, \ldots N, k=1, \ldots, n\} \subset \mathbb{C}$ for a fixed transmitter j∈ {1, . . . , L}. Obviously, P⊂S.

This set is finite, meaning that the space between the individual phases can be used for communication without disturbing the detection sequence s with outer coding.

This is illustrated in the example shown in FIG. 2. Herein, the phase-modulation sequence s is a bi-phase sequence and for outer coding a Hadamard type for four antennas is used, represented by the Hadamard matrix H with matrix members $H_{ij}$:

$$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (2)$$

The resulting detection sequence members have values only on the real axis, and especially consist of the set $\{-1,1\}$. This means that a whole complex half circle (positive or negative real part) could be used for orthogonal communication coding Γ.

Preferably, a communication range C in the complex number plane is selected as (3)

$$C := \left\{ e^{i\varphi} : -\frac{\pi}{n} \leq \varphi < \frac{\pi}{n} \right\}.$$

For the bi-phase example given above, n equals 2, which means that the communication range C lies in an angular range between −90° and +90°, which is visualized in FIG. 2 as a shaded area.

In case of a multi-phased phase-modulation sequence with n=4, i.e. detection sequence members of (+1, +i, −1,−i), a selected communication range C is shown in FIG. 3, wherein communication phase-modulation is restricted to an angular range of −45° to 45° (shaded area).

The special waveform design disclosed herein leads to specific properties, which can be exploited. Firstly, the resulting, sent out sequence (as a multiplication of the phase-modulation sequence, outer coding H and mapped communication sequence c), leads to phase values that are spread over the whole complex unit circle, $\mathbb{U} = S \cdot C$. For instance, a chip $s_k$, multiplied with a communication phase vector $s_k \Gamma(c_i)$ would be reflected at the origin via getting multiplied with −1 from the outer coding. This means that the resulting, sent out sequence is realized in the whole complex unit circle $\mathbb{U}$ and not in only P, S or C.

The larger the set S that corresponds to the selected phase-modulation sequence, the smaller the set C has to be chosen. Nevertheless, set C is infinite. This means that in principle a maximum number T within the communication symbols is not restricted, but the larger T the less robust the radar system becomes to phase errors and undesired shifts.

With the knowledge that communication and detection coding are orthogonal it is possible for the communication partner to encode the communication signal although there is no a priori information available about the sent detection sequence (even with outer coding).

Preferably, the equidistant bi-phased or multi-phased phase-modulation sequence is selected from a group comprising, without being limited to, m-sequence, Zadoff-Chu sequence, Legendre sequence or Almost Perfect Autocorrelation Sequence or any other sequence on finite sets. In this way, phase-modulation sequences with well-known properties can readily be provided according to the desired application. It will be noted that the above group is not exhaustive but that the present invention works in principle for all sequences on finite sets.

In preferred embodiments, the PMCW radar system is configured to work in a multiple-input and multiple-output (MIMO) configuration, and the step of generating a detection sequence s includes applying a Hadamard matrix.

The phrases "configured to" and "configured for", as used in this application, shall in particular be understood as being specifically programmed, laid out, furnished or arranged.

An exemplary scheme of the orthogonal modulation by a communication sequence c in addition to the outer coding H, which for a MIMO configured radar system with four transceiver antenna units is given by the 4×4-Hadamard matrix described in (2), is illustrated for the fourth transceiver antenna unit in FIG. 4.

In a possible embodiment, the communication sequence c comprises a plurality of e.g. four to twenty members. In this way, a favorable compromise between a sufficient and reliable coding and a robustness of the coding with respect to phase errors and undesired shifts can be accomplished. It will however be noted that sequences with much more or less members are possible.

In preferred embodiments of the method, the injective mapping function can be expressed as (4):

$$\Gamma(c) = \exp\left(i\frac{\pi(2c-(T+1))}{n(T+1)}\right), \Gamma: \{0, 1, \ldots, T\} \to C$$

wherein c denotes the value of a member of the communication sequence c (c: $\mathbb{N} \to \{1,2, \ldots, T\}$ with $T \in \mathbb{N}$ ), n denotes the maximum possible number of different roots of unity for the members of the equidistant bi-phased or multi-phased phase-modulation sequence ($n \in \mathbb{N}$ is the number of phases in S, n:=|S|), and T denotes the maximum value of the members of the communication sequence c.

In this way, an effective injective mapping function $\Gamma$ for mapping the communication sequence c into the communication range C can conveniently be provided:

$$C := \left\{ e^{i\varphi} : -\frac{\pi}{n} \le \varphi < \frac{\pi}{n} \right\}.$$

In another aspect of the invention, a method of demodulating phase-modulated continuous radar waves that are orthogonally modulated by a sequence of numerical communication symbols by the method disclosed herein is provided. The phase-modulated continuous radar waves to be demodulated are directly received.

The demodulating method includes steps of:
applying a communication backprojection function $\Omega$ to the received phase-modulated continuous radar waves for mapping the numerical communication symbols to the communication range C, wherein the communication backprojection function $\Omega$ can be expressed as (5)

$$\Omega(\tilde{c}) = \sum_{k=0}^{n-1} \chi_{C_k}(\tilde{c}) e^{-2\pi i \frac{k}{n} \tilde{c}},$$

wherein n denotes the maximum possible number of different roots of unity for the members of the equidistant biphased or multi-phased phase-modulation, $\tilde{c}$ is an image of a member of the communication sequence (c) in the communication range (C), and $\chi_{C_k}(\tilde{c})$ is the characteristic function with a value of 1 if the argument lies within the subset $C_k$ of the complex unit circle $\mathbb{U}$ and a value of 0 else, and
extracting the numerical communication symbols by applying the inverse function of the injective mapping function $\Gamma$ to images of the mapped numerical communication symbols in the communication range C.

With the knowledge that communication sequence coding and detection sequence coding are orthogonal it is possible for the communication partner to decode the communication signal although there is no information about the sent detection sequence (even with outer coding).

This can be performed by applying the communication backprojection function $\Omega$ for backprojection of the received sequence to the communication range C.

The complex unit circle $\mathbb{U} := \{z \in \mathbb{C} : \|z\|=1\}$ can be separated into subsets $$C_k := e^{2\pi i \frac{k}{n}} C \subset \mathbb{U}$$

for k=0, . . . , n−1 such that $\mathbb{U} = \bigcup_{k=0}^{n-1} C_k$.
Obviously, $C = C_0$.

The communication backprojection function $\Omega(c)$ $$\Omega: \mathbb{U} \to C, \tilde{c} \mapsto \sum_{k=0}^{n-1} \chi_{C_k}(\tilde{c}) e^{-2\pi i \frac{k}{n} \tilde{c}}$$

is not injective, but it maps all communication sequence members, which are spread all over the complex unit circle $\mathbb{U}$, back to the communication range C where the communication sequence members can be extracted via the inverted injective mapping function $\Gamma$.

In this way, an effective communication backprojection function $\Omega$ for mapping the communication sequence c of the directly received phase-modulated continuous radar waves into the communication range C can conveniently be provided.

This is illustrated in FIG. 5 for an embodiment with n=5. All phases of directly received radar waves that are located in $C_3$ will be projected to $C=C_0$ via the communication backprojection function $\Omega$ by a rotation about the origin of the complex plane. Also, the communication backprojection function $\Omega$ will project the vectors $$e^{2\pi i \frac{4}{5}}, e^{2\pi i \frac{3}{5}}, e^{2\pi i \frac{2}{5}}$$

and $$e^{2\pi i \frac{1}{5}}$$

to me same vector $$e^{2\pi i \frac{0}{5}} = 1.$$

In another aspect of the invention, a communication sequence demodulating device is provided that comprises a radar wave receiving unit that is configured for directly receiving phase-modulated continuous radar waves, and a radar signal processing unit that is configured for carrying out the above described method of demodulating phase-modulated continuous radar waves that are directly received.

In a further aspect of the invention, a method of demodulating phase-modulated continuous radar waves that are orthogonally modulated by a sequence of numerical communication symbols by the method disclosed herein is provided for the case that the phase-modulated continuous radar waves to be demodulated are received after having been reflected by a target.

The demodulating method includes steps of:

applying a detection sequence backprojection function Δ to the received phase-modulated continuous radar waves for projecting all phases lying in a specific subset of the complex unit circle $\mathbb{U}:=\{z\in\mathbb{C}:\|z\|=1\}$ onto a specific complex root of unity that lies within the specific subset, wherein the detection sequence backprojection function Δ can be expressed as (6)

$$\Delta(\tilde{c}) = \sum_{k=0}^{n-1} \chi_{C_k}(\tilde{c}) e^{2\pi i \frac{k}{n}}$$

wherein n denotes the maximum possible number of different roots of unity for the members of the equidistant bi-phased or multi-phased phase-modulation, $\tilde{c}$ is an image of a member of the communication sequence (c) in the communication range (C), and $\chi_{C_k}(\tilde{c})$ is the characteristic function with a value of 1 if the argument lies within the subset $C_k$ of the complex unit circle $\mathbb{U}$ and a value of 0 else, and applying a PMCW radar signal processing method to the projected phases.

In this way, the orthogonal modulation by the communication sequence c, which is of no relevance to the ego radar system as it is a priori known to the radar wave transmitting system, can be eliminated in preparation of a following radar signal processing.

In this way, an effective detection sequence backprojection function Δ for projecting all phases lying in a specific subset of the complex unit circle $\mathbb{U}$ onto a specific complex root of unity that lies within the specific subset can conveniently be provided.

This is illustrated in FIG. 6 for an embodiment with n=5 and a specific subset of the complex unit circle $\mathbb{U}$ that is given by the subset $C_3$. All phases of phase-modulated continuous radar waves that have been received after having been reflected by a target and that are located in $C_3$ will be projected to vector $$e^{2\pi i \frac{3}{5}}$$

via the detection sequence backprojection function Δ.

PMCW radar signal processing methods are known in large variety to those skilled in the art, and are described, for instance, in the published thesis by Óscar Faus García, "Signal Processing for mmWave MIMO Radar", Gävle University College, Sweden, 2015. In principle, any PMCW radar signal processing method that appears suitable to those skilled in the art may be applied.

In yet another aspect of the invention, a detection sequence backprojection demodulating device is provided that comprises a radar wave receiving unit that is configured for receiving phase-modulated continuous radar waves that have been reflected by a target, and a radar signal processing unit that is configured for carrying out the above described method of demodulating phase-modulated continuous radar waves that have been reflected by a target.

In yet another aspect of the invention, an automotive PMCW radar system is provided. The automotive PMCW radar system comprises:

a radar wave transmitting unit that is configured to orthogonal modulate phase-modulated continuous radar waves by conducting an embodiment of the method of orthogonal modulation disclosed herein, and to transmit the orthogonal modulated radar waves towards a scene with potential objects to be detected, an embodiment of the communication sequence demodulating device as disclosed herein, and an embodiment of the detection sequence backprojection demodulating device as disclosed herein.

Preferably, the radar wave transmitting unit comprises a plurality of at least two transceiver antenna units, which are configured to work in a MIMO configuration. In MIMO configurations with a plurality of transceiver antenna units, each transceiver antenna unit is understood to be able to transmit radar waves in an independent manner that represent mutually orthogonal codes. Each transceiver antenna unit is further understood to be able to receive radar waves that have been transmitted by itself and any of the other transceiver antenna units and that have been reflected by an object without any cross talk disturbance. MIMO radar configurations provide benefits regarding enlarged size of virtual aperture, improved spatial resolution and less sensitivity to interference signals, as is well known in the art.

The term "automotive", as used in this application, shall particularly be understood to encompass an application for a vehicle such as, but not limited to, passenger cars, trucks and buses.

The benefits described in context with the disclosed methods of orthogonal modulation and demodulation of phase-modulated continuous radar waves applied to the disclosed automotive PMCW radar system to the full extent.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

Figure 1:
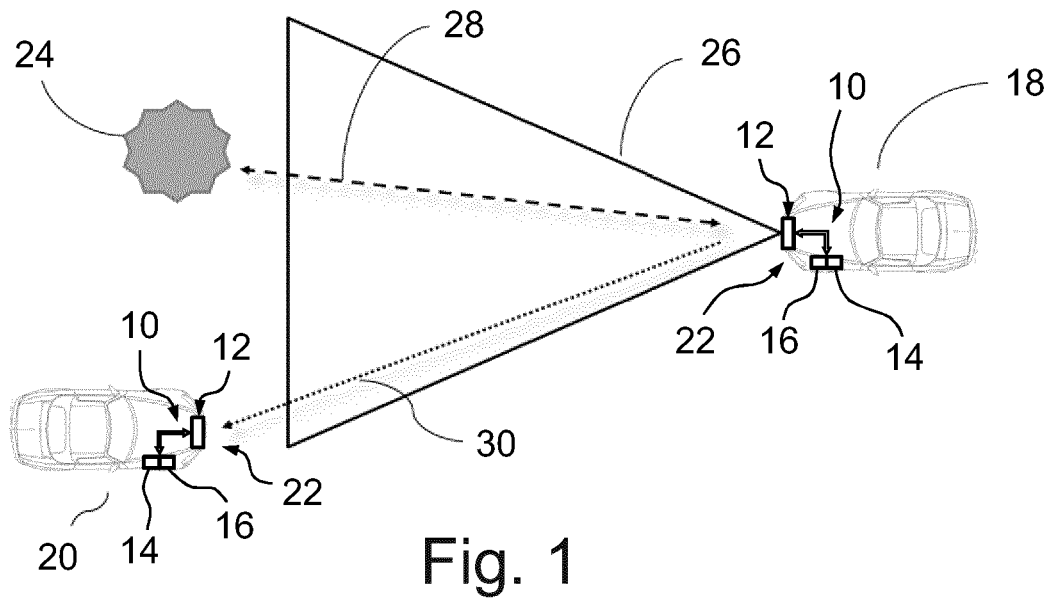
FIG. 1 shows a schematic top view on an automotive traffic scenery including two mutually approaching vehicles, each vehicle being furnished with an automotive PMCW radar system in accordance with an embodiment of the invention.
Figure 2:
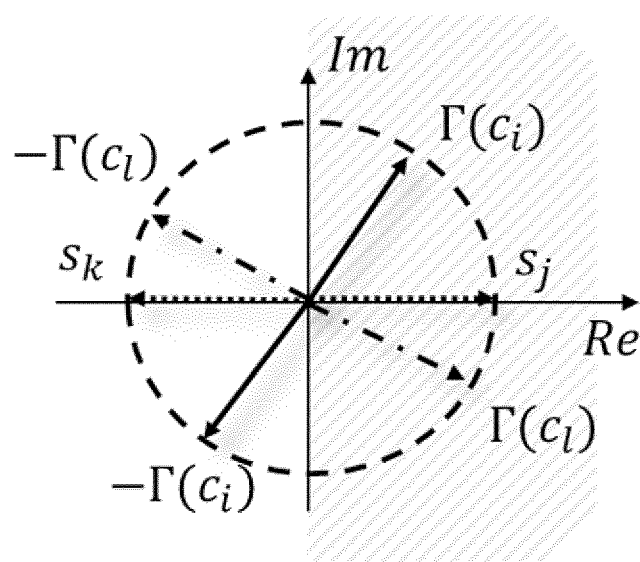
FIG. 2 is an illustration of positions of a detection sequence for a bi-phased phase-modulation, positions of a communication sequence and a communication range in the complex plane.
Figure 3:
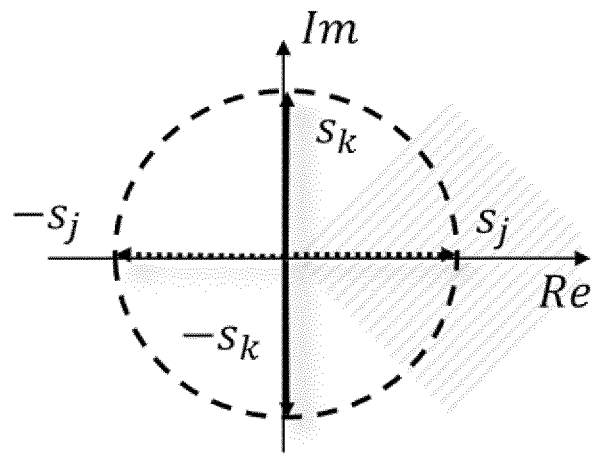
FIG. 3 is an illustration of positions of a detection sequence for a multi-phased phase-modulation with n=4, and a position of a communication range in the complex plane.
Figure 4:
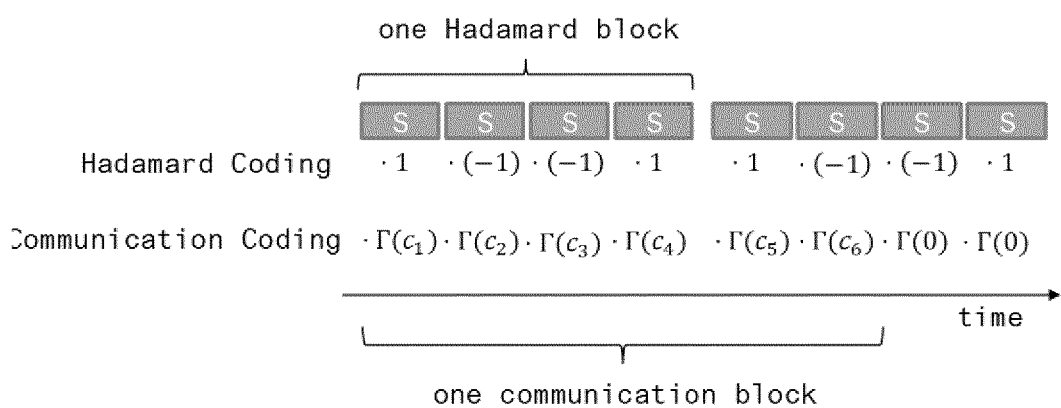
FIG. 4 shows an exemplary scheme of an orthogonal modulation by a communication sequence out the coding in addition to an outer coding given by Hadamard coding.
Figure 5:
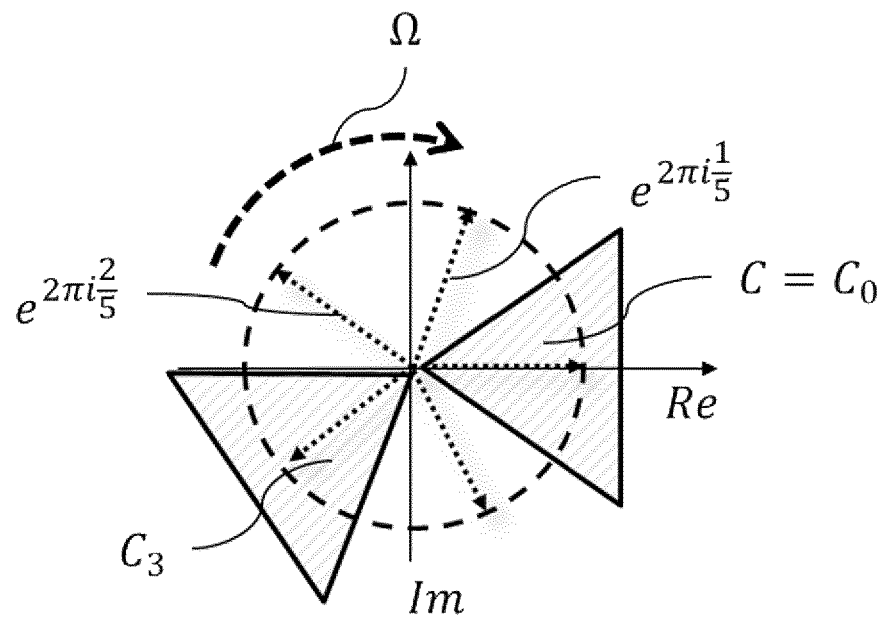
FIG. 5 is an illustration of the effect of a communication backprojection function for a multi-phased phase-modulation with n=5.
Figure 6:
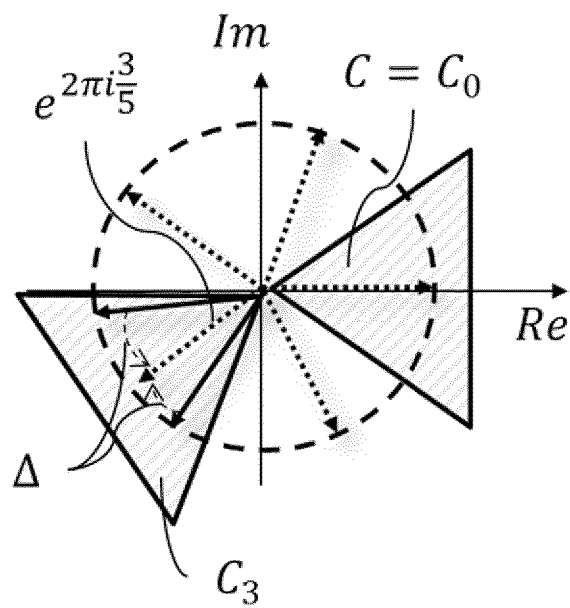
FIG. 6 is an illustration of the effect of a detection sequence backprojection function for a multi-phased phase-modulation with n=5.
Figure 7:
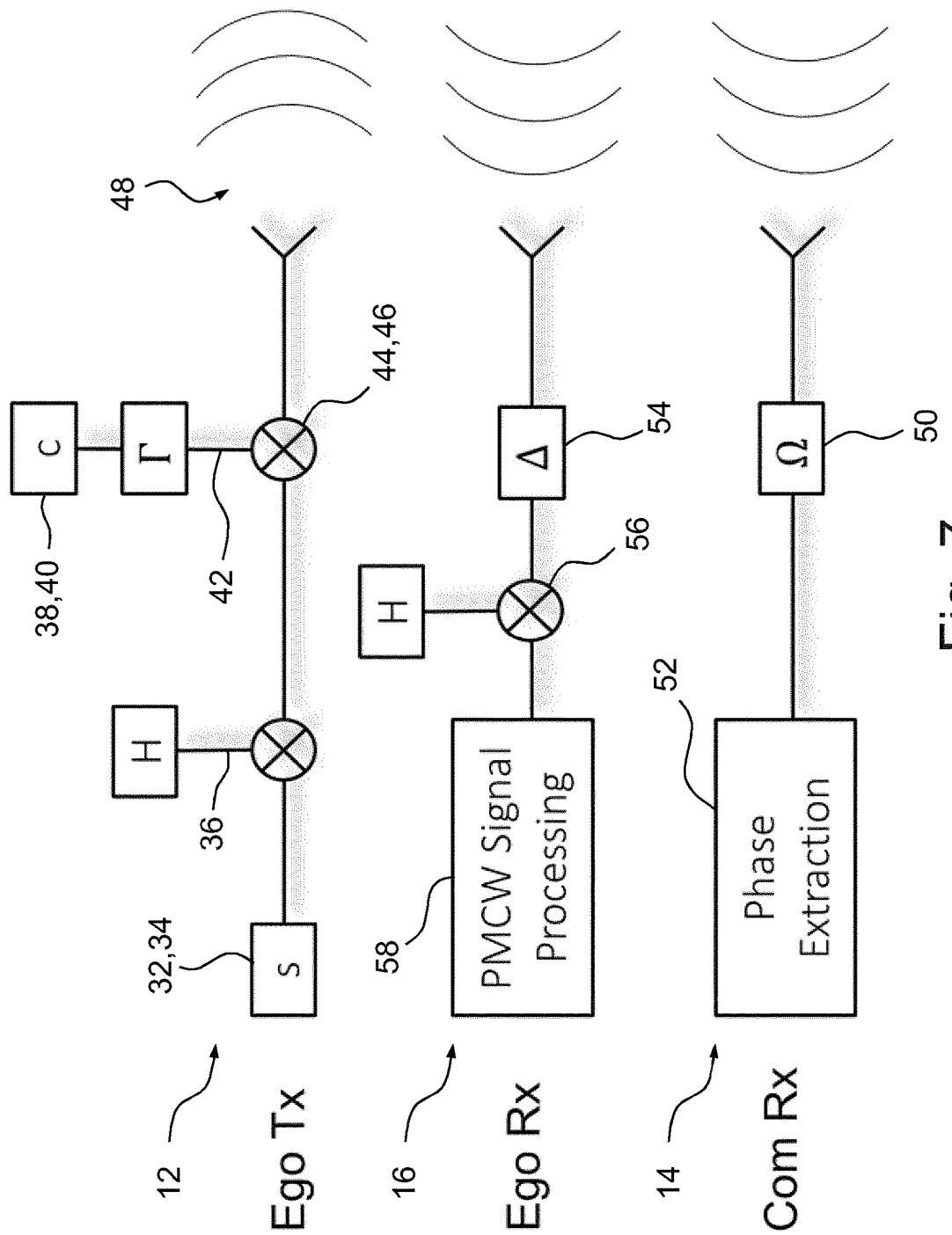
FIG. 7 shows a block diagram of one of the automotive PMCW radar systems pursuant to FIG. 1 in accordance with the invention.

FIG. 7 shows a block diagram of one of the identically designed automotive PMCW radar systems 10 pursuant to FIG. 1 in accordance with an embodiment of the invention. The PMCW radar system 10 includes a radar wave transmitting unit 12, a communication sequence demodulating device 14 and a detection sequence backprojection demodulating device 16.

The radar wave transmitting unit 12 is configured to orthogonal modulate phase-modulated continuous radar waves by a sequence of numerical communication symbols, and to transmit the orthogonal modulated radar waves towards the scene in front of the vehicle 18 shown in FIG. 1 with potential objects such as the obstacle 24 to be detected. The radar wave transmitting unit 12 comprises a plurality of four transceiver antenna units (not shown), which are arranged at a front region 22 of the respective vehicle 18, 20 and that are configured to work in a MIMO configuration. It will be appreciated that the number of four transceiver antenna units is only chosen as an example but that any other number of transmitters is possible.

In a first step 32 of the method (FIG. 7) of orthogonal modulation of radar waves of the PMCW radar system 10, an equidistant multi-phased phase-modulation is selected, which in this specific embodiment is a bi-phased phase-modulation, wherein members of the phase-modulation are given by complex roots of unity, in this case −1 and +1, i.e. n=2.

In another step 34 of the method, a bi-phased phase-modulation sequence is selected to be (−111111−1−11−11−1−1−111).

In the next step 36 of the method, a detection sequence s is generated by applying an outer coding to the bi-phased phase-modulation sequence, which in this specific embodiment is given by the fourth row of the 4×4 Hadamard matrix H=[1−1−11].

Then, in another step 38 of the method, a communication range C in the complex number plane is selected, based on the selected equidistant bi-phased phase-modulation, to be the section of the complex unit circle $\mathbb{U}$ between angles of $$-\frac{\pi}{2}$$

and $$+\frac{\pi}{2}.$$

A communication sequence c is generated in another step 40, comprising a plurality of 18 sequence members, which are natural numbers:

c=(414141332233414141)

Figure 8:
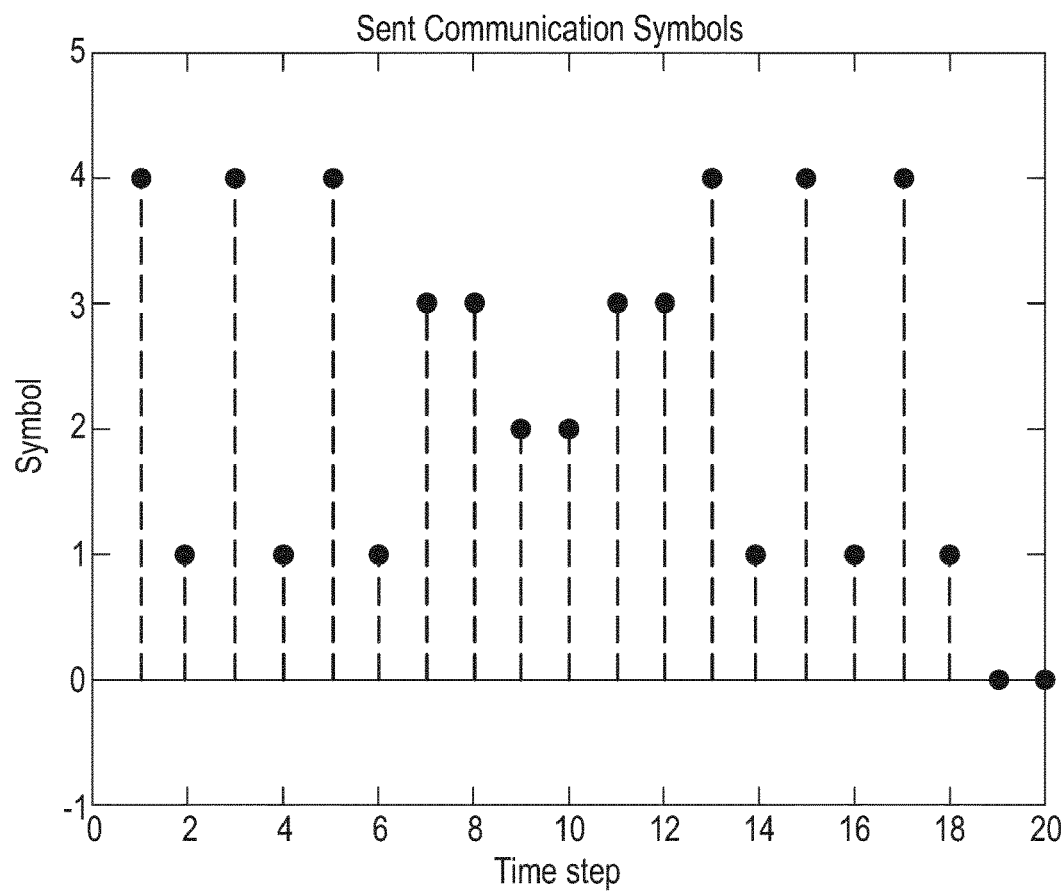
FIG. 8 is an illustration of the detection sequence and the communication sequence.
Figure 8:
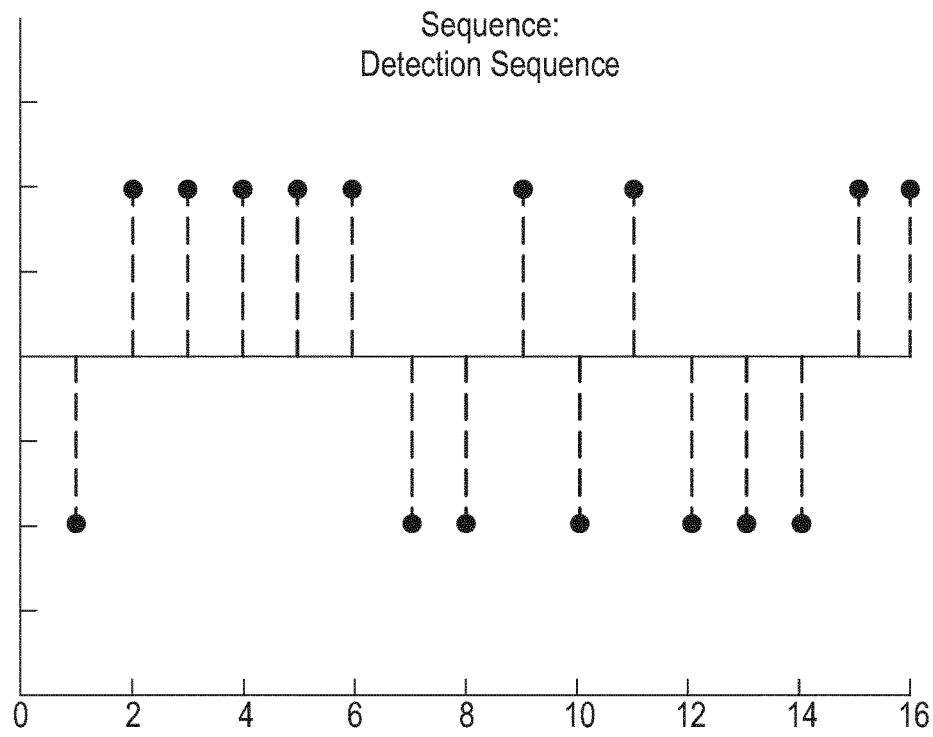

The communication sequence c is filled up with zeros to match an integral multiple of the fourth row of the 4×4 Hadamard matrix H. The detection sequence s (mixed with H) and the communication sequence c are illustrated in FIG. 8.

In the next step 42 of the method (FIG. 7), the communication sequence c is mapped into the communication range C by applying the injective mapping function Γ(c) to the members of the communication sequence c.

Further, a numerical product of members of the detection sequence s (mixed with H) with members of the image of the mapped communication sequence c is calculated in another step 44. Then, the continuous wave of the radar system 10 is phase-modulated according to the calculated numerical products in another step 46. In the next step 48, the phase-modulated continuous radar wave is transmitted towards the scene.

Figure 9:
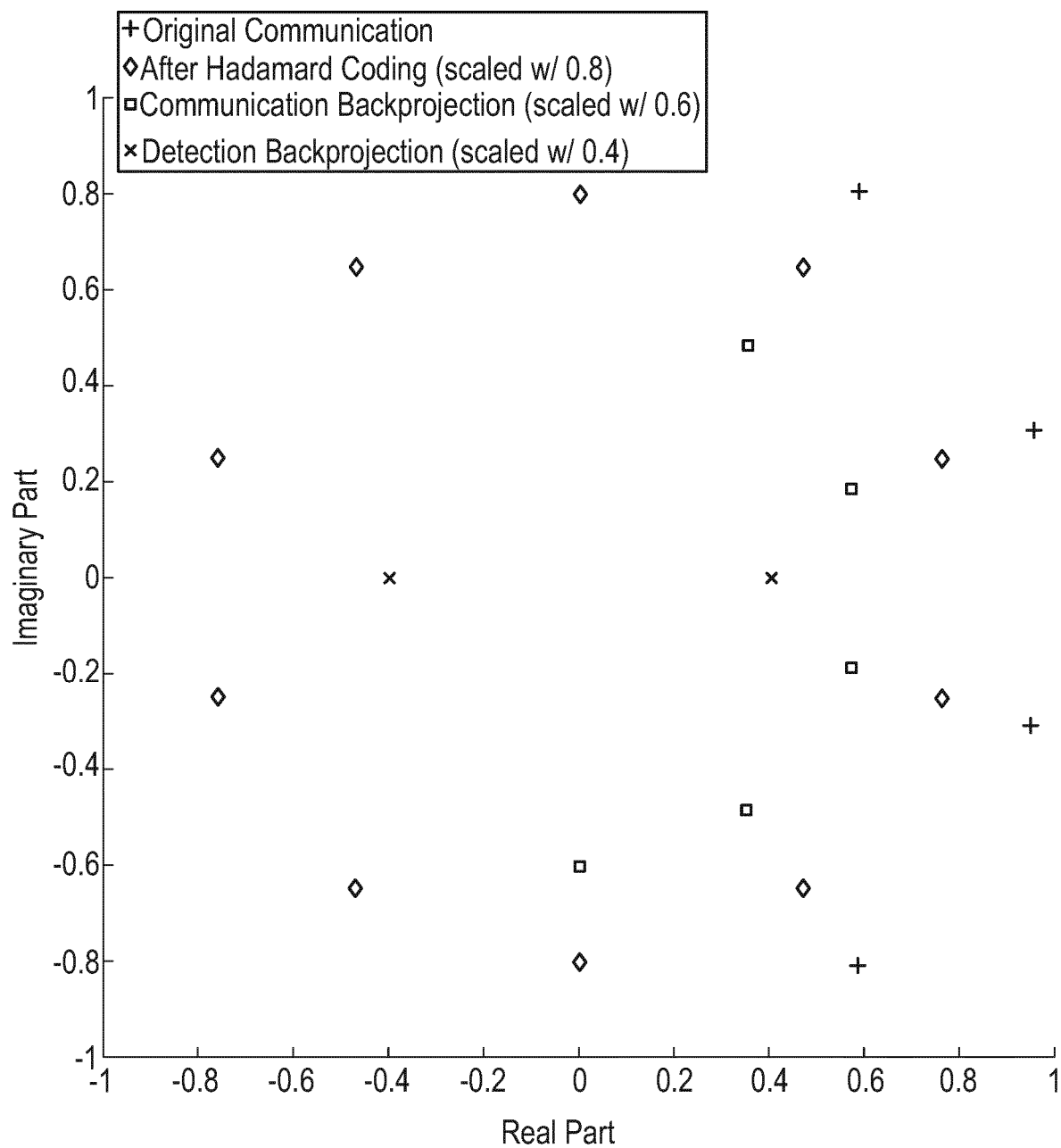
FIG. 9 illustrates the resulting phase-modulations at different states.

The resulting transmitted phase-modulations after mixing the detection sequence s (mixed with H) with the mapped communication sequence c is illustrated in FIG. 9. Herein, the original communication sequence c is located in the positive real half plane (straight crosses). After mixing with the detection sequence s (mixed with H), the resulting phase shifts are located over the whole complex plane (diamonds). In FIG. 9, the various data series are downscaled for the purpose of clarity. In reality, all phases lie within the complex unit circle $\mathbb{U}$.

Figure 10:
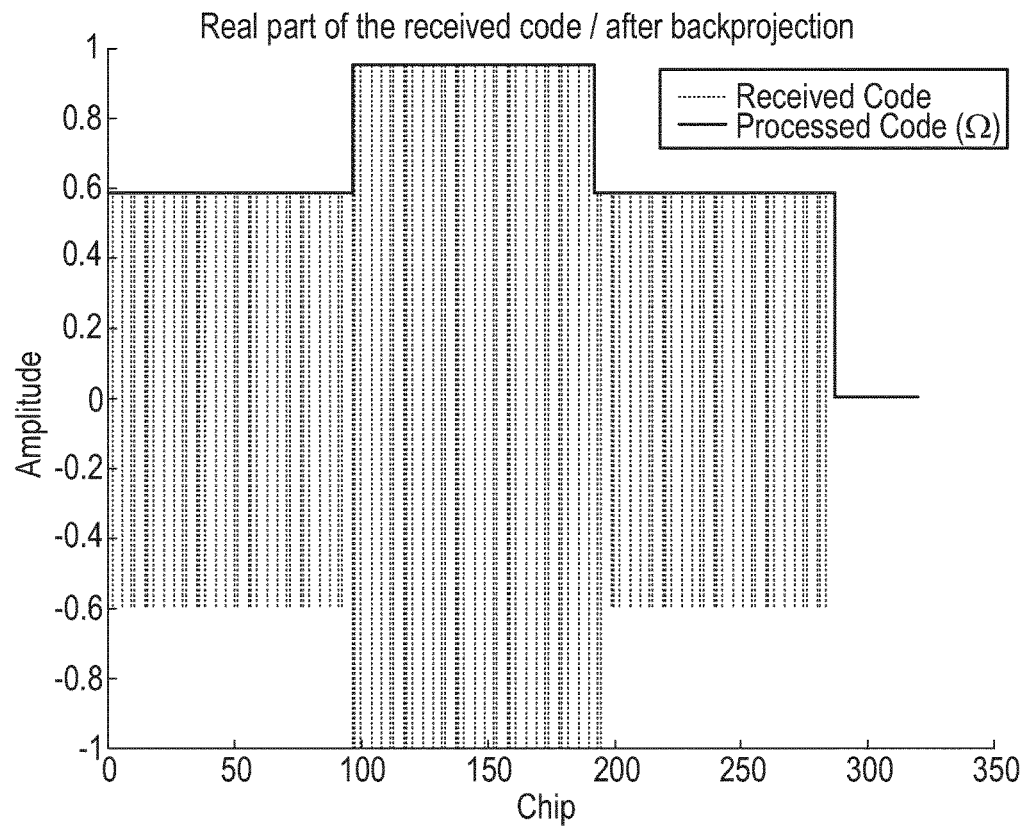
FIG. 10 shows real (upper half) and imaginary (lower half) parts of the received phase-modulated continuous radar waves before and after applying the communication backprojection function.
Figure 10:
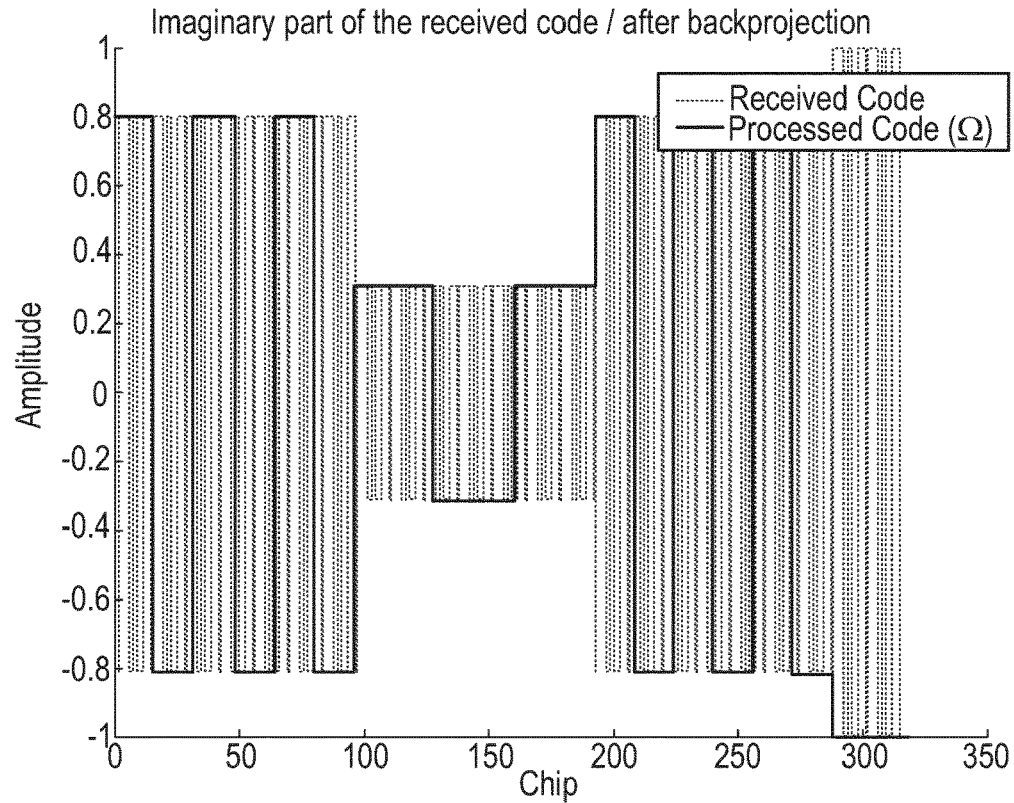

Referring again to FIG. 7, in the communication sequence demodulating device 14 of the communication partner PMCW radar system 10, which is identical to the one of the ego radar system, the transmitted phase-modulated continuous radar waves are received. In a step 50 of a demodulation method, which is carried out by the radar signal processing unit of the communication sequence demodulating device 14, the communication backprojection function Ω is applied to the received phase-modulated continuous radar waves. As shown in FIG. 9 by open squares, the communication backprojection function Ω maps the numerical communication symbols back to the positive real half plane, i.e. to the communication range C. A waveform of the received phase-modulated continuous radar waves (dotted lines) before and after applying the communication backprojection function Ω (solid line) is illustrated in FIG. 10 (upper half: real part, lower half: imaginary part).

Figure 11:
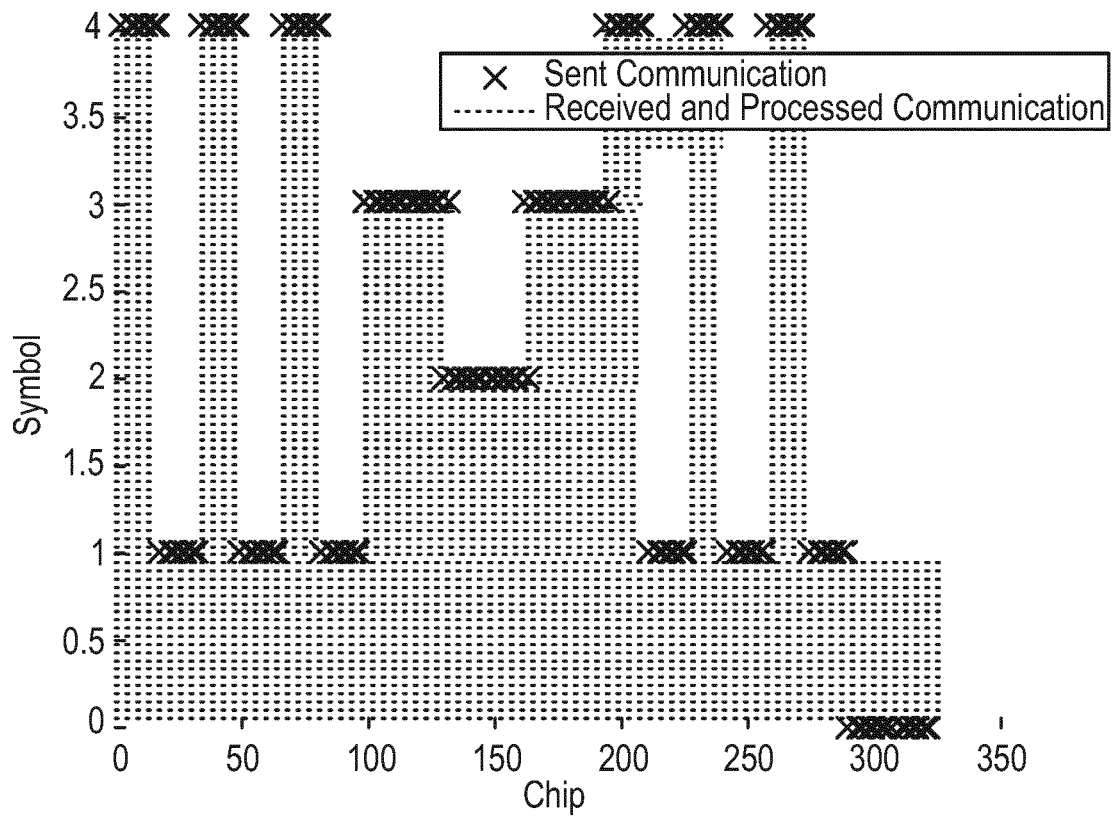
FIG. 11 shows the resulting sequence after applying the communication backprojection function and applying the inverse function of the injective mapping function to the images of the mapped numerical communication symbols in the communication range.

The resulting sequence after applying the communication backprojection function Ω and applying the inverse function of the injective mapping function Γ to the images of the mapped numerical communication symbols in the communication range C in another step 52 (FIG. 7) is illustrated in FIG. 11.

The orthogonal modulation of the phase-modulated continuous radar waves by the communication sequence c is of no relevance to the ego radar system 10. Rather, the ego radar system 10 serves to resolve the detection sequences (mixed with H).

In the detection sequence backprojection demodulating device 16 of the Ego radar system 10 (FIG. 7), phase-modulated continuous radar waves that have been reflected by a target are received by a radar wave receiving unit. In a step 54 of a demodulation method, which is carried out by the radar signal processing unit of the detection sequence backprojection demodulating device 16, the detection sequence backprojection function Δ is applied to the received phase-modulated continuous radar waves for projecting all phases lying in a specific subset of the complex unit circle U onto a specific complex root of unity that lies within the specific subset, in this case all phases lying in the positive real half plane to +1, and all phases lying in the negative real half plane to −1, see FIG. 9 (slanted crosses).

Figure 12:
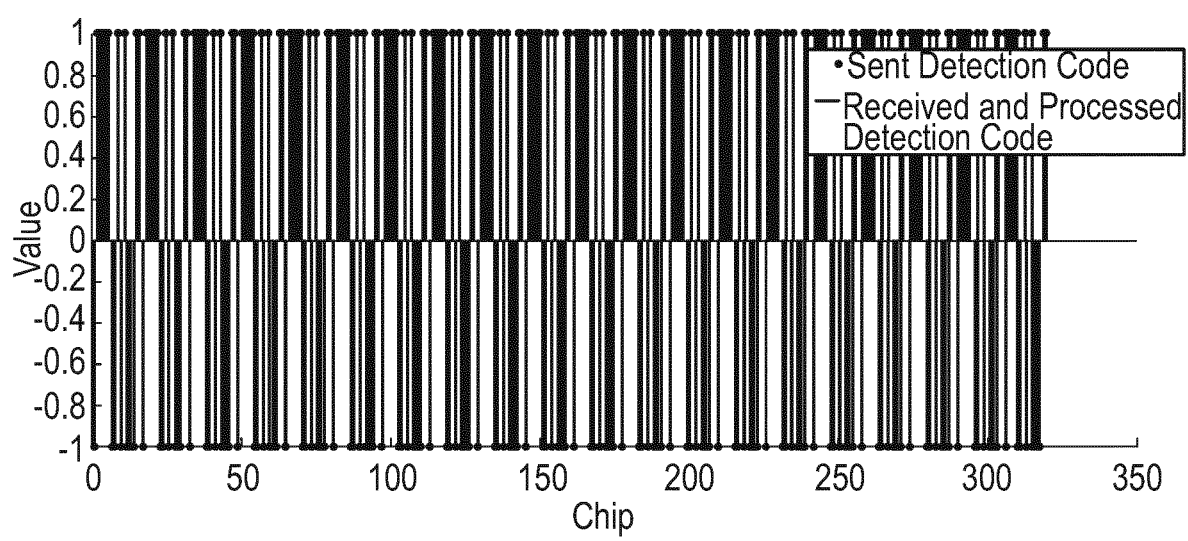
FIG. 12 shows the reconstructed detection sequence per chip after applying the detection sequence backprojection function, multiplying with the outer coding and applying a PMCW radar signal processing method.

After a step 56 (FIG. 7) of multiplying with the outer coding given by the Hadamard matrix H, another step 58 of applying a PMCW radar signal processing method to the projected phases is performed by the radar signal processing unit of the detection sequence backprojection demodulating device 16, in which the sequence is exactly reconstructed, as is shown in FIG. 12 (transmitted detection sequence: solid line, detection sequence from processing received phase-modulated continuous radar waves: dots).

Although in this specific embodiment the ego radar system 10 installed in vehicle 18 and the radar system 10 installed in vehicle 20 are identically designed, it will be readily acknowledged by those skilled in the art that the desired communication, even if only one-way, can also take place if vehicle 20 is equipped only with a communication sequence demodulating device as disclosed herein, and is not furnished with a radar wave transmitting unit or a detection sequence backprojection demodulating device.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A method of orthogonal modulation of radar waves of a phase-modulated continuous wave radar system by a sequence of numerical communication symbols, the method comprising steps of:
   selecting an equidistant bi-phased or multi-phased phase-modulation sequence, wherein members of the sequence are given by complex roots of unity,
   phase-modulating the continuous radar wave of the radar system, and
   transmitting the orthogonal phase-modulated continuous radar wave towards a scene,
   and the method being characterized by the following steps of:
   generating a detection sequence (s) by applying an outer coding (H) to the bi-phased or multi-phased phase-modulation sequence,
   selecting a communication range (C) in the complex number plane, based on the selected equidistant bi-phased or multi-phased phase-modulation,
   generating a communication sequence (c) comprising a plurality of sequence members, wherein the members are natural numbers,
   mapping the communication sequence (c) into the communication range (C) by applying an injective mapping function (Γ) to the members of the communication sequence (c),
   calculating a numerical product of members of the detection sequence (s) with members of an image of the mapped communication sequence (c),
   wherein the step of phase-modulating the continuous radar wave of the radar system is carried out according to the calculated numerical products.

2. The method as claimed in claim 1, wherein the selected equidistant bi-phased or multi-phased phase-modulation sequence is selected from a group comprising m-sequence, Zadoff-Chu sequence, Legendre sequence or Almost Perfect Autocorrelation Sequence.

3. The method as claimed in claim 1, wherein the phase-modulated continuous wave radar system is configured to work in a multiple-input and multiple-output configuration, and the step of generating a detection sequence (s) includes applying a Hadamard matrix (H).

4. The method as claimed claim 1, wherein the injective mapping function (Γ) can be expressed as:

$$\Gamma(c) = \exp\left(i\frac{\pi(2c - (T+1))}{n(T+1)}\right)$$

wherein c denotes the value of a member of the communication sequence (c), n denotes the maximum possible number of different roots of unity for the members of the equidistant bi-phased or multi-phased phase-modulation, and T denotes the maximum value of the members of the communication sequence (c).

5. A method of demodulating phase-modulated continuous radar waves that are orthogonally modulated by a sequence of numerical communication symbols by the method as claimed in claim 1, wherein the phase-modulated continuous radar waves are directly received, the method comprising steps of:
   applying a communication backprojection function Ω to the received phase-modulated continuous radar waves for mapping the numerical communication symbols to the communication range (C), wherein the communication backprojection function Ω can be expressed as:

$$\Omega(\tilde{c}) = \sum_{k=0}^{n-1} \chi_{C_k}(\tilde{c}) e^{-2\pi i \frac{k}{n} \tilde{c}},$$

wherein n denotes the maximum possible number of different roots of unity for the members of the equidistant bi-phased or multi-phased phase-modulation, $\tilde{c}$ is an image of a member of the communication sequence (c) in the communication range (C), and $\chi_{C_k}(\tilde{c})$ is the characteristic function with a value of 1 if the argument lies within the subset $C_k$ of the complex unit circle $\mathbb{U}$ and a value of 0 else, and extracting the numerical communication symbols by applying the inverse function of the injective mapping function ($\Gamma$) to images of the mapped numerical communication symbols in the communication range (C).

6. A method of demodulating phase-modulated continuous radar waves that are orthogonally modulated by a sequence of numerical communication symbols by the method as claimed in claim 1, wherein the phase-modulated continuous radar waves are received after having been reflected by a target, the method comprising steps of:

applying a detection sequence backprojection function $\Delta$ to the received phase-modulated continuous radar waves for projecting all phases lying in a specific subset of the complex unit circle $\mathbb{U}$ onto a specific complex root of unity that lies within the specific subset, wherein the detection sequence backprojection function $\Delta$ can be expressed as:

$$\Delta(\tilde{c}) = \sum_{k=0}^{n-1} \chi_{C_k}(\tilde{c}) e^{2\pi i \frac{k}{n}}$$

wherein n denotes the maximum possible number of different roots of unity for the members of the equidistant bi-phased or multi-phased phase-modulation, $\tilde{c}$ is an image of a member of the communication sequence (c) in the communication range (C), and $\chi_{C_k}(\tilde{c})$ is the characteristic function with a value of 1 if the argument lies within the subset $C_k$ of the complex unit circle $\mathbb{U}$ and a value of 0 else, and applying a phase-modulated continuous wave radar signal processing method to the projected phases.

7. A communication sequence demodulating device for demodulating phase-modulated continuous radar waves that are orthogonally modulated by a sequence of numerical communication symbols by the method as claimed in claim 1, wherein the phase-modulated continuous waves are directly received, the device comprising:

a radar wave receiving unit that is configured for receiving phase-modulated continuous radar waves, and a radar signal processing unit that is configured for carrying out a method that comprises the steps of:

applying a communication backproiection function $\Omega$ to the received phase-modulated continuous radar waves for mapping the numerical communication symbols to the communication range (C), wherein the communication backproiection function $\Omega$ can be expressed as:

$$\Omega(\tilde{c}) = \sum_{k=0}^{n-1} \chi_{C_k}(\tilde{c}) e^{-2\pi i \frac{k}{n}} \tilde{c},$$

wherein n denotes the maximum possible number of different roots of unity for the members of the equidistant bi-phased or multi-phased phase-modulation, $\tilde{c}$ is an image of a member of the communication sequence (c) in the communication range (C), and $\chi_{C_k}(\tilde{c})$ is the characteristic function with a value of 1 if the argument lies within the subset $C_k$ of the complex unit circle $\mathbb{U}$ and a value of 0 else, and extracting the numerical communication symbols by applying the inverse function of the injective mapping function ($\Gamma$) to images of the mapped numerical communication symbols in the communication range (C).

8. A detection sequence backprojection demodulating device for demodulating phase-modulated continuous radar waves that are orthogonally modulated by a sequence of numerical communication symbols by the method as claimed in claim 1, wherein the phase-modulated continuous waves are received after having been reflected by a target, the device comprising:

a radar wave receiving unit for receiving phase-modulated continuous radar waves, and a radar signal processing unit that is configured for carrying out a method that comprises the steps of:

applying a detection sequence backproiection function $\Delta$ to the received phase-modulated continuous radar waves for projecting all phases lying in a specific subset of the complex unit circle $\mathbb{U}$ onto a specific complex root of unity that lies within the specific subset, wherein the detection sequence backproiection function $\Delta$ can be expressed as:

$$\Delta(\tilde{c}) = \sum_{k=0}^{n-1} \chi_{C_k}(\tilde{c}) e^{2\pi i \frac{k}{n}}$$

wherein n denotes the maximum possible number of different roots of unity for the members of the equidistant bi-phased or multi-phased phase-modulation, $\tilde{c}$ is an image of a member of the communication sequence (c) in the communication range (C), and $\chi_{C_k}(\tilde{c})$ is the characteristic function with a value of 1 if the argument lies within the subset $C_k$ of the complex unit circle $\mathbb{U}$ and a value of 0 else, and applying a phase-modulated continuous wave radar signal processing method to the projected phases.

9. An automotive phase-modulated continuous wave radar system, comprising a radar wave transmitting unit that is configured to orthogonally modulate phase-modulated continuous radar waves by a sequence of numerical communication symbols by conducting a method as claimed in claim 1, and to transmit the orthogonal modulated radar waves towards a scene with potential objects to be detected, a communication sequence demodulating device for demodulating the orthogonal modulated radar waves, wherein the orthogonal modulated radar waves are directly received, the communication sequence demodulating device comprising:

a radar wave receiving unit that is configured for receiving phase-modulated continuous radar waves, and a radar signal processing unit that is configured for carrying out a method that comprises the steps of:

applying a communication backproiection function $\Omega$ to the received phase-modulated continuous radar waves for mapping the numerical communication symbols to the communication range (C), wherein the communication backproiection function $\Omega$ can be expressed as:

$$\Omega(\tilde{c}) = \sum_{k=0}^{n-1} \chi_{C_k}(\tilde{c}) e^{-2\pi i \frac{k}{n}} \tilde{c},$$

wherein n denotes the maximum possible number of different roots of unity for the members of the equidistant bi-phased or multi-phased phase-modulation, $\tilde{c}$ is an image of a member of the communication sequence (c) in the communication range (C), and $\chi_{C_k}(\tilde{c})$ is the characteristic function with a value of 1 if the argument lies within the subset $C_k$ of the complex unit circle $\mathbb{U}$ and a value of 0 else, and extracting the numerical communication symbols by applying the inverse function of the injective mapping function ($\Gamma$) to images of the mapped numerical communication symbols in the communication range (C), and a detection sequence backprojection demodulating device for demodulating the orthogonal modulated radar waves, wherein the orthogonal modulated radar waves are received after having been reflected by a target, the device comprising:

a radar wave receiving unit for receiving phase-modulated continuous radar waves, and a radar signal processing unit that is configured for carrying out a method that comprises the steps of:

applying a detection sequence backproiection function $\Delta$ to the received phase-modulated continuous radar waves for projecting all phases lying in a specific subset of the complex unit circle $\mathbb{U}$ onto a specific complex root of unity that lies within the specific subset, wherein the detection sequence backproiection function $\Delta$ can be expressed as:

$$\Delta(\tilde{c}) = \sum_{k=0}^{n-1} \chi_{C_k}(\tilde{c}) e^{2\pi i \frac{k}{n}}$$

wherein n denotes the maximum possible number of different roots of unity for the members of the equidistant bi-phased or multi-phased phase-modulation, $\tilde{c}$ is an image of a member of the communication sequence (c) in the communication range (C), and $\chi_{C_k}(\tilde{c})$ is the characteristic function with a value of 1 if the argument lies within the subset $C_k$ of the complex unit circle $\mathbb{U}$ and a value of 0 else, and applying a phase-modulated continuous wave radar signal processing method to the projected phases.

* * * * *